Figure 1:
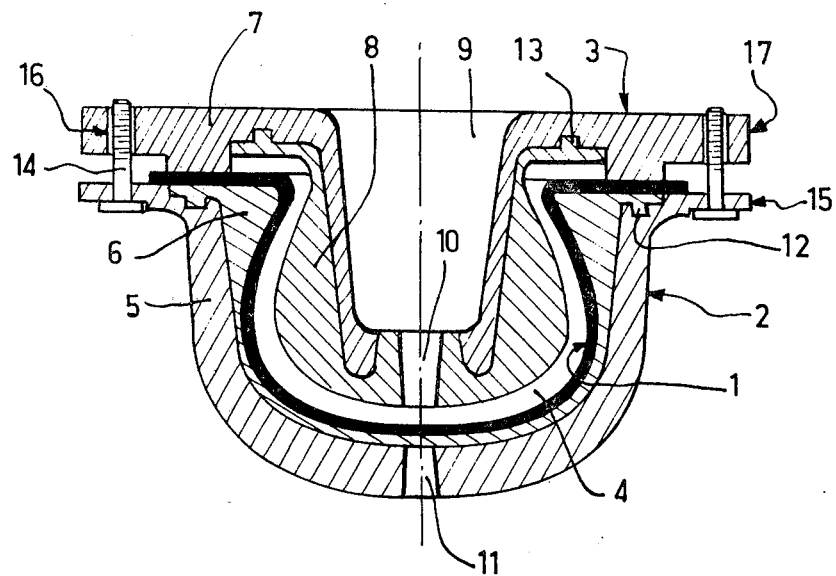

United States Patent [19]

Evrard et al.

[11] 4,123,494
[45] Oct. 31, 1978

[54] METHOD AND APPARATUS FOR REINFORCING A HOT SHAPED SHELL

[75] Inventors: Paul Evrard, Gisors; Michel-Claude Terroy, Puiseux le Hauberger, both of France

[73] Assignee: Altulor, Paris, France

[21] Appl. No.: 813,348

[22] Filed: Jul. 6, 1977

[51] Int. Cl.² .......................... B29D 9/00; B29F 1/00
[52] U.S. Cl. ............................ 264/258; 264/267; 264/313; 264/318; 264/328; 264/334
[58] Field of Search ............... 264/259, 337, 334, 318, 264/313, 294, 257, 258, 314, 316, 225, 328, 267; 425/129 R, DIG. 44, 127

[56] References Cited

U.S. PATENT DOCUMENTS

| | | | |
|---|---|---|---|
| 2,714,226 | 8/1955 | Axelrad | 264/337 |
| 3,158,906 | 12/1964 | Boyer | 425/DIG. 44 |
| 3,218,377 | 11/1965 | Gremigni | 425/DIG. 44 |
| 3,294,887 | 12/1966 | Altermatt | 264/257 |
| 3,309,450 | 3/1967 | Rodgers | 264/257 |
| 3,520,961 | 7/1970 | Suda et al. | 264/313 |
| 3,618,179 | 11/1971 | Anderson et al. | 425/DIG. 44 |
| 3,654,062 | 4/1972 | Loew | 264/259 |

OTHER PUBLICATIONS

Morton, Rubber Technology, Van Nostrand, N.Y. (1974), pp. 225 & 226.

Primary Examiner—W.E. Hoag
Attorney, Agent, or Firm—Oblon, Fisher, Spivak, McClelland & Maier

[57] ABSTRACT

The present invention relates to a method and apparatus for reinforcing an object or article essentially comprising a hot-shaped shell, and more particularly to reinforcing a hot-shaped thermoplastic resin sheet with a resin/glass fibre laminate.

According to the invention there is provided a method for reinforcing an article or object which essentially comprises a hot-shaped shell, comprising supporting a surface of the shell on an elastically deformable pad intimately matable therewith, placing a mould part having a working surface of shape complementary to the other surface of the shell so that a free space is formed between the mould part and the shell, injecting a reinforcing resin into the free space and then demoulding the thus-reinforced shell.

According to the invention there is also provided an apparatus for carrying out the method, comprising an elastically deformable pad adapted to support (and intimately matable with) a surface of a hot-shaped shell, a mould part complementary to the shape of the other surface of the shell, and means for injecting resin under pressure into the free space formed between the mould part and the shell when in assembled position.

9 Claims, 2 Drawing Figures

METHOD AND APPARATUS FOR REINFORCING A HOT SHAPED SHELL

The present invention relates to a method and apparatus for reinforcing an object or article essentially comprising a hot-shaped shell, and more particularly to reinforcing a hot-shaped thermoplastic resin sheet with a resin glass fibre laminate.

French Pat. No. 75/29 312 discloses reinforcing a hot-shaped shell with a resin/glass fibre laminate, the operation being carried out by "contact", i.e. by manually applying cloth and brushing on resin, or by spraying glass fibres and polyester resin simultaneously or consecutively.

The first such mode of preparation is rather slow in execution and unsuited for mass production; as for the second mode of preparation, it has been found to be hard to perform on small-sized articles, especially those with cutback or mecked portions.

An aim of the invention is a method and apparatus for the industrial manufacture of articles essentially comprising a resin-reinforced hot-shaped shell.

According to the invention there is provided a method for reinforcing an article or object which essentially comprises a hot-shaped shell, comprising supporting a surface of the shell on an elastically deformable pad intimately matable therewith, placing a mould part having a working surface of shape complementary to the other surface of the shell so that a free space is formed between the mould part and the shell, injecting a reinforcing resin into the free space and then demoulding the thus-reinforced shell.

According to the invention there is also provided an apparatus for carrying out the method, comprising an elastically deformable pad adapted to support (and intimately matable with) a surface of a hot-shaped shell, a mould part complementary to the shape of the other surface of the shell, and means for injecting resin under pressure into the free space formed between the mould part and the shell when in assembled position.

The present method and apparatus permit the industrial manufacture of reinforced hot-shaped shell articles and more particularly articles of small size, the injection under pressure of reinforcing resin being made possible by using an elastic pad which distributes stress over the shell and thereby avoids the formation of tiny cracks and reduces the risk of splits in the shell.

Moreover, if the mould part working surface is elastically deformable it is possible to reinforce shell articles having cutback or necked portions and it makes it easy to demould them.

Figure 2:
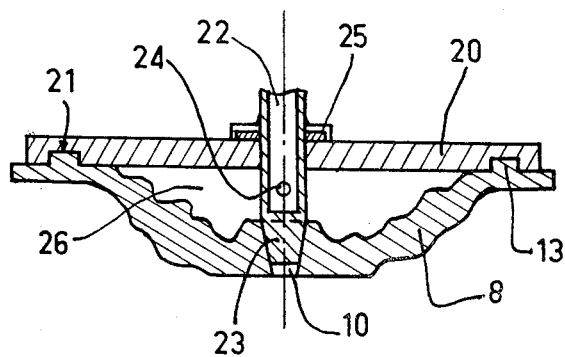

The invention will now be described in greater detail having reference to a preferred embodiment, given by way of non limiting example, and illustrated in the accompanying drawings, in which:

FIG. 1 shows a cross-sectional view of an apparatus for strengthening a hot-shaped shell; and FIG. 2 shows a cross-sectional view of an apparatus for positioning the deformable member of the male part in the mould.

The description which follows relates to the manufacture of a motorcyle helmet; it is an article of relative small dimensions which comprises a reinforced hot-shaped shell with a cutback or necked portion, which is rather hard to produce according to known methods.

To carry out the method of reinforcing the shell, the apparatus represented in FIG. 1 is employed, which apparatus essentially comprises two main mould parts or units, a female or negative would part 2 accommodating the hot-shaped shell 1 for the helmet and a male or positive mould part 3 which is disposed substantially inside the shell when in position. The male and female mould parts 3 and 2 are of complementary shape to the inner and outer surface of the shell 1 so that the female mould part 2 closely mates with the outer surface of the shell while the male mould part 3 forms with the inner surface of the shell a free space.

Each mould part comprises a rigid support bearing an elastically deformable, pliable member which lines the rigid support.

Thus the female mould part 2 essentially comprises a rigid support 5 comprising a cup with a slightly flaring side wall lined with an elastically deformable member 6 which is in intimate mating contact with the outer surface of the shell 1. The rigid support 5 is, for example, made of laminated polyester and the elastically deformable member 6 is preferably polynorbornene rubber, solid under the mark "Norsorex"; the support may be of any other rigid material, metal or nonmetal, and the elastically deformable member may be made of another elastomer which is sufficiently firm to effectively support the shell but also sufficiently elastically deformable to conform intimately with the shape of the shell. The male or positive mould part or unit 3 likewise comprises a rigid support 7 with a tapering central wall covered with an elastically deformable member 8 preferably made of polymerised silicon resin, sold under the mark "Silastene", the support 7 being made, for example, of laminated polyester. In orded to reduce the weight of the apparatus, the support 7 is hollow and has a central cavity 9 communicating with an injection orifice 10 which extends through the portion of the deformable member 8 forming the bottom of the cavity 9, the bore of the orifice 10 is slightly conical to improve the sealing connection with a conduit supplying reinforcing resin (not shown).

The rigid support 5 of the female mould part 2 has at least one aperture 11 for facilitating the unsticking and removal of the deformable member 6 from its rigid support 5.

Locating teats 12 and 13 are provided for positioning the elastically deformable members 6, 8 on their respective supports 5, 7, the teats being received in corresponding locating recesses in their supports. The supports 5 and 7 are in turn located with respect to each other by positioning studs 14 passing through a flange 15 on the rigid support 5 and received in corresponding positioning holes 16 in a flange 17 on the rigid support 7. During the injection of the reinforcing resin the rigid supports are joined to each other by conventional clamping means such as bolts, clamps or the like.

During the injection of the reinforcing resin between the male mould part 3 and the hot-shaped shell, the latter is subjected to relatively high pressure forces which produce substantial stressing. Since the shell is preferably formed of methly polymethacrylate it is rather fragile and therefore risks rupture or cracking where it is inadequately supported and where stressing is critical. It is therefore important for the shell to be completely and uniformly supported at all points which will only be the case where the female mould part 2 intimately mates with the outer surface of the shell which has a necked or cutback portion. "Fragile", as hereinafter used with respect to the shell means the shell is subject to rupture or cracking at the injection pressure used in the process if the shell is not supported at all points.

Likewise, in order that the free space formed between the male mould part 3 and the shell may be of substantially constant height throughout, it will be important for the outer surface of the male mould part to be of complementary shape to the inner surface of the shell even for necked portions 8 of the deformable member.

For these various reasons the male and female mould parts 3 and 2 of the present apparatus have elastically deformable members 6 and 8 which allow them to adapt themselves completely to the shape of the hot-shaped shell 1, to distribute the stresses uniformly owing to the give of the elastically deformable material and to permit easy demoulding; the mould parts or units are constructed in the following manner.

For the elastically deformable member 6 to perfectly mate with the shell, the elastically deformable material is "poured" around the outer surface of the shell; in other words it is covered with a layer of polynorbornene rubber which is sufficient to eliminate the necked or cut back portions of at least 5 mm, then, after gelling, the covering is reinforced with a polyester laminate forming the rigid support 5, and since it is impossible to couple these two materials locating teats and recesses 12 are provided for positioning the elastically deformable member with respect to the rigid support.

As the assembly is fixed in position and rigidified, the interior of the shell is coated with a calibrating layer of wax the thickness of which corresponds to glass fibre resin laminate which is desired on the shell.

Moreover, care is taken in making the rigid support 7 of laminated polyester so that there is no necked or cutback portion. The silicon resin, for example, is poured into the assembly comprising the cup-shaped rigid support 5, the elastically deformable member 6 and the shell covered with the layer of calibration wax; the rigid support 7 is pushed into position, forcing the silicon resin to flow along the wall of the shell up to the point it flows out through vent holes drilled in the rigid support 7 and it is positioned by means of positioning studs 14 extending into holes 16 so that it takes the same position after demoulding. After polymerization the assembly is taken apart, the calibrating layer of wax is removed and orifices 10 and 11 are provided in the elastically deformable member 8 and the rigid support 5.

The "mould" thus constructed comprises a "die" consisting of the hot-shaped shell 1 supported by its pad 6 of polynorbornene rubber which is in turn supported by the rigid support 5, and a male part 3 made up of a rigid support 7 covered with an elastically deformable member 8, which, when closing the mould, is introduced first alone and deformed in the shell 1, then shaped by the introduction of the support 7 which is received in the last-mentioned elastically deformable member.

The elastically deformable member 8 is introduced and removed with the help of the device shown in FIG. 2, simply comprising a plate 20 with locating recesses 21 at its periphery adapted to receive teats 13 of the elastically deformable member 8 through which passes a central tube 22. One end of the tube 22 is closed off by a frustoconical tip 23 adapted to be fitted in the injection orifice 10 in the elastically deformable member 8, and an opening 24 is provided in tube 22 in the vicinity of the tip 23; the other end of the tube is connected to a vacuum pump (not illustrated) and a sealing member 25 provided fluid-tightness at the junction of the tube 22 and the plate 20. When the mould is to be closed the elastically deformable member 8 is mounted on the plate 20 with its locating teats 13 in the recesses 21 and the tip 23 closing off the injection orifice 10, then the sealed space 26 between the plate and the member 8 brought under partial vacuum; the deformable member 8 collapses and its necked or cutback portion disappears which make it easy to introduce into the hot-shaped shell 1. Once in position the space 26 is at ambient pressure so that the outer deformable member takes on again its normal shape, with its necked portion, the plate 20 is taken off and the rigid support 7 is put into position to maintain the desired shapes of the deformable members.

The reinforcing of the hot-shaped shell is effected in the following manner.

Once the shell 1 is surrounded by the elastically deformable member 6 and put into place in the rigid female support 5, glass fibre mate and/or glass fibres are appropriately cut to overlie one another and the mould is closed, placing the outer deformable member 8 and the rigid male support 7 as described above; the rigid supports 5 and 7 are then clamped together. It is important for the assembly not to be hermetically sealed; this is done either by clamping the glass fibre between the rigid male support 7 and the hot-shaped shell 1 or by forming striations in the surface of the rigid male support 7 in contact with the shell.

By means of an injection machine resin is introduced under a pressure between 1 to 10 bar through the injection orifice 10 in the elastically deformable member 8; care is taken so that this step is carried out as slowly as possible so as to eliminate bubbles and voids in the glass fibres and to avoid the formation of air pockets, the injection continuing until the resin flows out, for example through the radial striations in the rigid support 7.

The give of the elastically deformable members 6 and 8 allows the pressures to be absorbed and stress distributed over the hot-shaped shell the sheet is uniformly supported by the member 6 which serves as a pressure distributing pad, preventing tiny cracks.

When the polymerization of the reinforcing resin is completed, the reinforced shell is demoulded by withdrawing the rigid male support 7 which, owing to its tapered configuration, is removed easily, then the elastically deformable member 8 is collapsed by means of the device illustrated in FIG. 2 and the resin-reinforced shell, together with elastically deformable member 6, is removed from the cup-shaped female support 5. The elastically deformable member 6 is then pulled off the shell like a sock.

With the injection moulding method taught herein, which is made possible tanks to the pressure distributing pad 6 supporting the hot-shaped shell, the shell can be quickly and easily reinforced despite the pressure of necked or cutback portions.

The scope of the invention is of course not limited to the illustrated embodiment but covers all modifications differing only by the means employed.

It goes without saying that the present invention is not only applicable to the manufacture of motorcycle helmets but also concerns the manufacture of all objects and articles comprising a hot-shaped shell requiring reinforcement or a simple inner or outer covering.

What is claimed is:

1. A method for reinforcing a fragile, hot-shaped, hollow shell in a mold, comprising:

placing said fragile shell against an elastically deformable female member shaped to uniformly mate with said shell and uniformly support said shell against molding stresses; pressing a male mold member within said shell against peripheral portions of said shell thereby forming a mold cavity between said mold member and areas of said shell to be covered with a resin material; securing said male mold member to a rigid female support member; injecting a molding resin material into said mold cavity and hardening said material; and removing said resin coated shell from said mold.

2. The method of claim 1, wherein said elastically deformable female member is placed in a rigid female support member complementary to its shape.

3. The method of claim 1, which further comprises: placing an elastically deformable member whose working surface defines part of said mold cavity over said male mold member.

4. The method of claim 1, which further comprises: depositing fiber mats in a mutually overlying relationship on said shell within said mold cavity.

5. The method of claim 1, wherein the mold cavity between the rigid female support member and said shell is not fluid-tight, the injection of the resin being continued until the resin flows out of the mold at the interface of the rigid female support 6. The method of claim 1, which further comprises: depositing a layer of fibers in a mutually overlying relationship on said shell within said mold cavity.

7. The method of claim 6, wherein the molding resin is injected into the mold cavity at a rate which prevents the formation of bubbles or voids in the fibers.

8. The method of claim 1, wherein, when said shell has a necked portion, said elastically deformable male member is collapsed to allow insertion of said deformable male member into said shell through said necked portion.

9. The method of claim 8, wherein said deformable male member is removed from said mold by collapsing said deformable male member so that upon removal from the mold, the deformable male member clears said necked portion.

* * * * *